United States Patent [19]
Charneski et al.

[11] Patent Number: 5,982,428
[45] Date of Patent: Nov. 9, 1999

[54] PROGRAMMABLE CLOCK GENERATOR FOR AN IMAGING DEVICE

[75] Inventors: David M. Charneski, Hilton; Eugene M. Petilli, Penfield; Jay E. Endsley, Fairport, all of N.Y.

[73] Assignee: Eastman Kodak Company, Rochester, N.Y.

[21] Appl. No.: 08/777,430

[22] Filed: Dec. 30, 1996

[51] Int. Cl.⁶ .............................. H04N 3/14; H03L 7/00; G11C 19/00
[52] U.S. Cl. ............................ 348/312; 327/144; 377/77
[58] Field of Search ..................... 348/312, 322, 348/311, 318, 222, 294; 327/144; 377/54, 69, 75, 77, 78

[56] References Cited

U.S. PATENT DOCUMENTS

| | | | |
|---|---|---|---|
| 4,922,137 | 5/1990 | Small et al. | 377/78 |
| 5,039,950 | 8/1991 | McDermott | 328/62 |
| 5,450,129 | 9/1995 | Matoba et al. | 348/312 |
| 5,659,553 | 8/1997 | D'Alfonso et al. | 348/312 |
| 5,767,904 | 6/1998 | Miyake | 348/312 |

*Primary Examiner*—Tuan Ho
*Assistant Examiner*—Luong Nguyen
*Attorney, Agent, or Firm*—David M. Woods

[57] ABSTRACT

An imaging device for generating an image signal includes an image sensing device for producing an image signal subject to one or more clock signals and a circuit for generating one or more of the clock signals, wherein the clock signal generating circuit is responsive to a programmable input signal for adjusting a duty cycle of at least one of the clock signals. In particular, by clocking two recirculating shift registers out of phase and parallel loading them with a programmable bit pattern to produce the output clock signals, the frequency of an input clock that is required to produce the output clock signals can be reduced by half.

3 Claims, 5 Drawing Sheets

PROGRAMMABLE CLOCK GENERATOR FOR AN IMAGING DEVICE

CROSS-REFERENCE TO RELATED APPLICATION(S)

Reference is made to commonly assigned application Ser. No. 08/774,486 filed Dec. 30, 1996, now U.S. Pat. No. 5,847,588 entitled "Programmable Multiple CCD Clock Synthesizer" and filed in the name of Bruce C. McDermott, which is assigned to the assignee of this application.

FIELD OF THE INVENTION

The invention relates generally to the field of digital integrated circuits, and in particular to the generation of periodic signals useful in digital integrated circuits. More specifically, the invention relates to the generation of clock signals for an imaging device.

BACKGROUND OF THE INVENTION

In digital integrated circuits which must produce a wide variety of signal patterns, it is often necessary to design special counters and/or state machines to produce the desired results. An example of this application is in the field of digital imaging, where a charge coupled device (CCD) imager is employed in much the same manner as traditional silver-halide film. A CCD imager is a digital device which usually requires a substantial number of input signals with specific and unique characteristics. These signals are often referred to as "clocks", since they are usually periodic in nature. However, due to the operating tolerances of the various electronic devices employed in digital imaging systems, it is often desirable or necessary to be able to slightly alter the duty cycle and/or phase of these CCD clocks. Specifically, it is desirable to be able to alter pulse width and pulse location within each pixel period. Traditionally, this as been accomplished with analog delay circuits, synchronous digital techniques and/or ad hoc approaches. The disadvantages of these approaches are significant. The analog delay circuits are expensive and often inaccurate. Most of the digital techniques require high frequency crystal oscillators which, in addition to being more expensive, can also result in undesirable levels of radiated electromagnetic interference. Rapid prototyping of these higher speed circuits with programmable logic is often impossible, thus forcing engineers to commit their designs to more expensive ASIC (Application Specific Integrated Circuit) technology before they have had the opportunity to test them in the system environment. Most of these techniques do not allow for in-system adjustment or tuning for optimal performance. This invention presents a method which overcomes these difficulties while also providing increased flexibility.

SUMMARY OF THE INVENTION

The present invention is directed to overcoming one or more of the problems set forth above. Briefly summarized, according to one aspect of the present invention, an imaging device for generating an image signal comprises an image sensing device for producing an image signal subject to one or more clock signals and means for generating said one or more clock signals, wherein the clock signal generating means is responsive to a programmable input signal for adjusting a duty cycle of at least one of the clock signals.

Among the many advantages of this invention, the frequency of an input clock signal that is required to produce the different output clock signals can be reduced by half. Reducing clock frequency results in several advantages, such as reducing EMI and potentially allowing the use of field programmable gate array technology to quickly prototype the hardware system. Moreover, the pulse widths and the positioning of the output pulses are programmable, thus obviating the need to physically change hardware if empirical techniques are required to determine proper pulse timing within an actual electronic system. Pulse width and positioning are also as accurate and precise as the quartz crystal oscillator required to produce the digital system clocks. This may provide an advantage over many analog delay techniques, which are subject to the wider tolerances of discrete passive components. In addition, depending on the requirements of the system, the invention can be implemented as part of an ASIC for as little as 200 to 300 gates per output signal, thus adding little, if any, cost to the overall system.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 5:
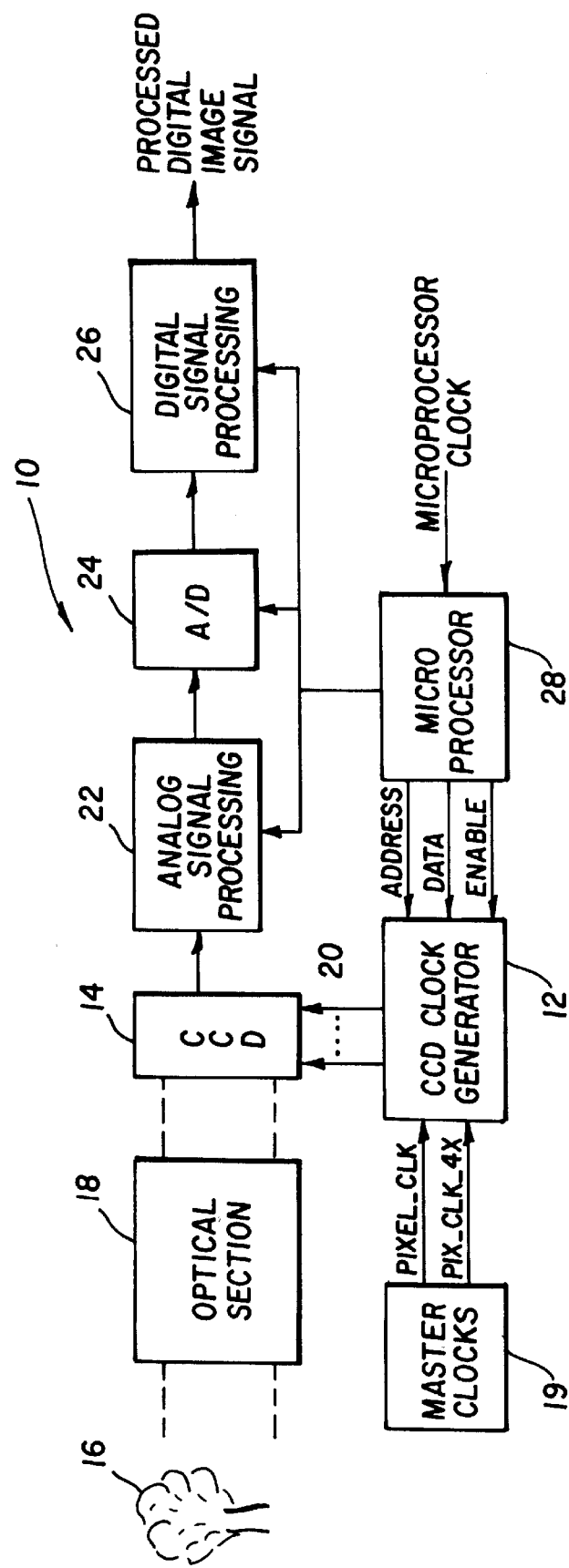
FIG. 5 is a block diagram of an imaging device employing a clock generator of the type shown in FIGS. 1A, 2A, 3 or 4.

Referring first to FIG. 5, an imaging device 10 is shown in a block diagram incorporating a clock generator 12 according to the invention. The clock generator 12 is used to drive, i.e., "clock", an image sensor 14, such as a charge-coupled device (CCD) sensor, which receives an image of an object 16 through an optical section 18. A master clock generator section 19 provides a relatively low frequency pixel clock (PIXEL_CLK) and a higher frequency 4X pixel clock (PIX_CLK_4X) to the clock generator 12. As is well known, the image sensor 14 requires a number of input clock signals 20 with characteristics specific to the type of sensor employed. The clock signals 20 are used, among other things, to output an image signal to an analog processing section 22, which adjusts the signal, e.g., for black level and gain. The image signal is then digitized in an analog-to-digital (A/D) converter 24 and output to a digital signal processing section 26, which may, e.g., apply a known compression algorithm, correct for sensor defects, interpolate for full color (if the sensor 14 is a color sensor), and the like. The digitally processed signal is then available for conventional utilization, e.g., transmission, storage, hard copy output, and so on. The various elements of the imaging device 10 are controlled by a microprocessor 28. More particularly, the microprocessor 28 provides a clocking PATTERN signal, via a data channel, and an ENABLE command to the clock generator 12 in order to begin a clocking sequence. As will be described in more detail, the PATTERN signal modifies the duty cycles of the clock signals 20.

Figure 1A:
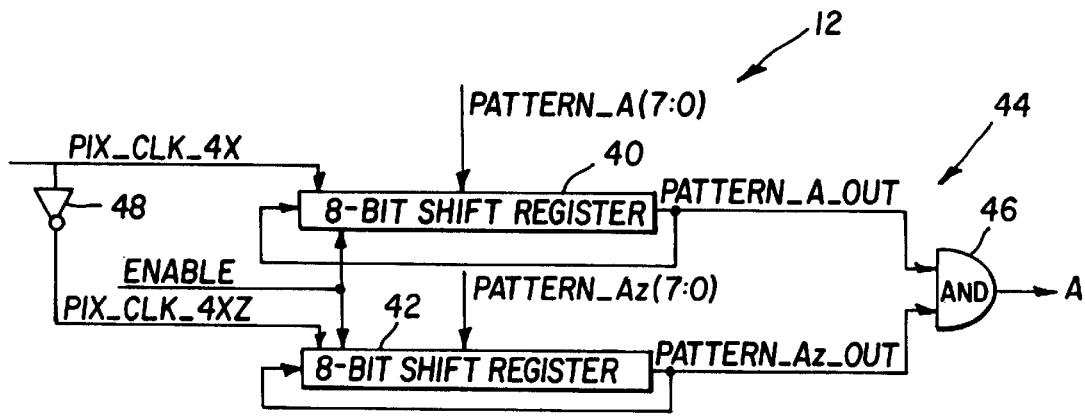
FIG. 1A is a diagram of a programmable clock generator according to the invention.

As further shown in FIG. 1A, the clock generator 12 comprises two serial shift registers 40 and 42 and an output decoding logic section 44, in this case an AND gate 46. The first shift register 40 is clocked by the PIX_CLK_4X signal, and the second shift register 42 is clocked by a PIX_CLK_4XZ signal, which is an inverted form of the PIX_CLK_4X signal as output by an inverter 48. As a consequence, the registers 40 and 42 are clocked out of phase with the output of one shift register or the other being updated every half period of the PIX_CLK_4X signal. Both shift registers 40 and 42 are parallel-in, serial-out registers, with initialization data input in parallel to set up the registers. More specifically, respective parallel-in signals PATTERN_A and PATTERN_AZ are loaded into the respective shift registers 40 and 42 when the ENABLE signal is asserted by the microprocessor 28. The outputs of the shift registers 40 and 42 are connected to their respective inputs to form recirculating shift registers in which the pattern loaded into each shift register repeats in a periodic fashion. The shift register output signals PATTERN_A_OUT and PATTERN_AZ_OUT are then decoded in the logic section 44 to produce the final output signal.

In the preferred embodiment, the pattern data loaded into each shift register 40 and 42 is chosen such that the only output decoding logic required is the AND function provided by the gate 46. More specifically, the clock generator 12 uses AND logic gates and 8-bit shift registers to produce a simple programmable timing generator. As shown in the timing diagram of FIG. 1B, two eight bit patterns (each 10001000) are parallel loaded into the shift registers 40 and 42. However, the scope of the invention does not preclude the use of other initialization patterns and other logic decoding techniques. Furthermore, the circuit shown in FIG. 1A is duplicated in the clock generator 12 for as many clock signals as are required to operate the image sensor 14. The microprocessor 28 would accordingly provide corresponding clocking PATTERN signals and control signals for these additional clock generator circuits.

Figure 1B:
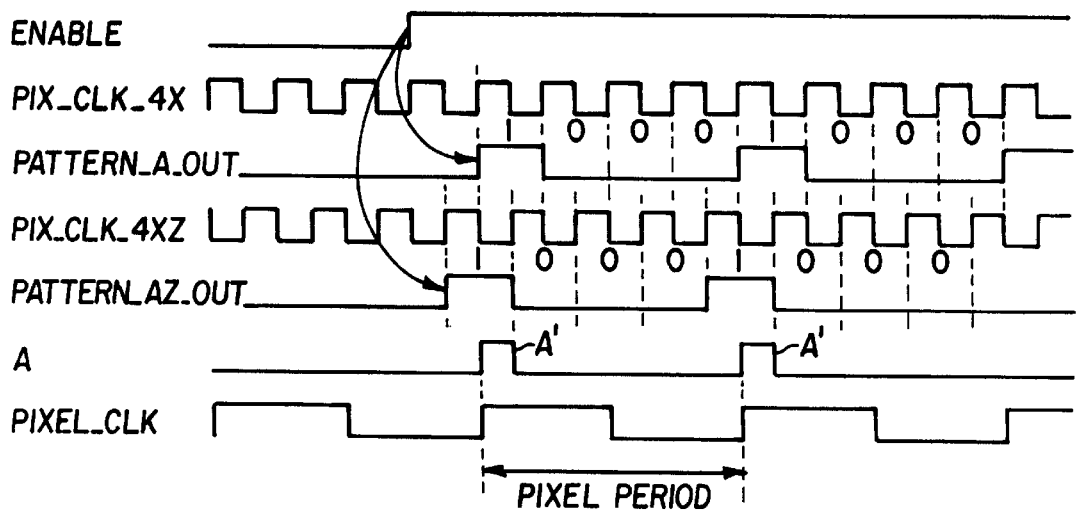
FIG. 1B is a timing diagram of the signals applied to, and produced by, the clock generator shown in FIG. 1A.

In operation, as shown in the timing diagram of FIG. 1B, both PATTERN_A and PATTERN_AZ are loaded into their respective shift registers 40 and 42 before the shift registers are enabled. When the ENABLE signal is asserted by the microprocessor 28, the patterns loaded into each shift register are clocked out in a serial fashion. Since the shift register outputs are connected to their inputs, the pattern repeats in a periodic fashion producing the waveforms labeled PATTERN_A_OUT and PATTERN_AZ_OUT. Output signal A from the AND gate 46 is the logical combination of PATTERN_A_OUT and PATTERN_AZ_OUT. Because the bit patterns are chosen to be the same and the PIX_CLK_4X and PIX_CLK_4XZ signals are the same signals inverted, the pattern signals PATTERN_A and PATTERN_AZ overlap. This prevents glitching (i.e., generation of signal artifacts) in the output pulse signal A. The position of output pulse A and the width of output pulse A can be varied in increments of one-half the PIX_CLK_4X period by simply changing the initialization patterns which are loaded into the serial shift registers. The PIXEL_CLK signal, which is one of the clock signals 20 shown in FIG. 5, is shown demonstrate how this invention could be used to generate the CCD timing clocks in a digital imaging system, specifically in this case, a CCD RESET pulse.

Figure 2A:
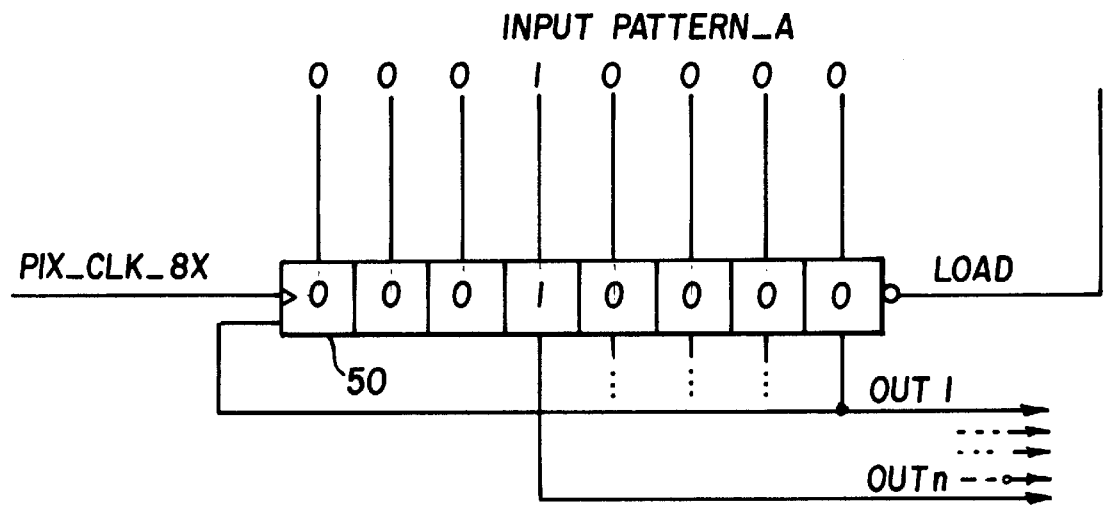
FIG. 2A is a diagram of a second implementation of a programmable clock generator according to the invention.
Figure 2B:
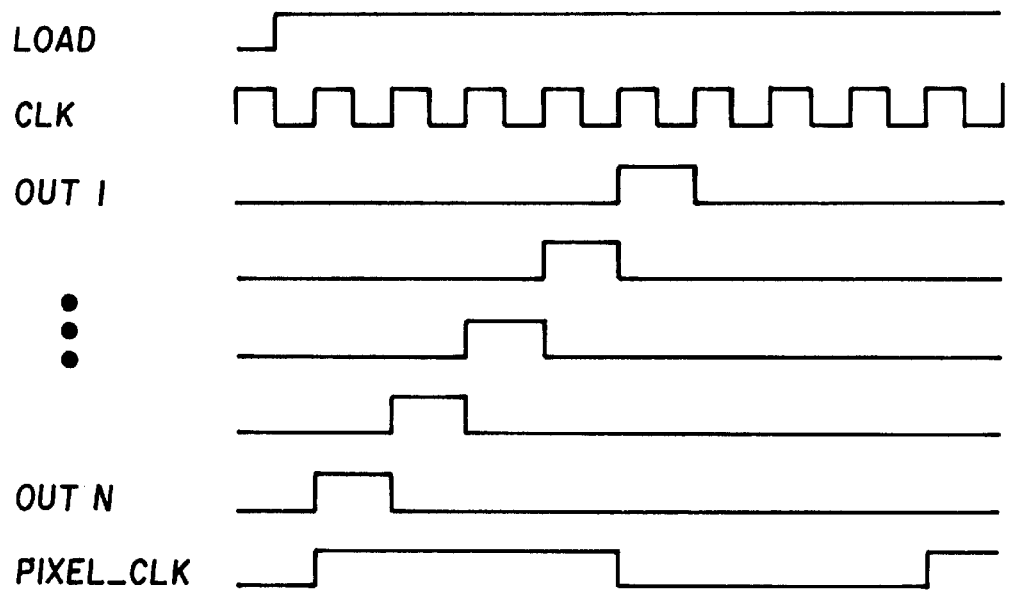
FIG. 2B is a timing diagram for the clock generator shown in FIG. 2A.

FIG. 2A shows a second embodiment of the clock generator 12 employing a single eight bit shift register 50, with its output recirculated back to its input. The same output as in FIG. 1B is obtained by running the CLK signal at 8 times the pixel clock (PIX_CLK_8X, in order to produce the same pulse widths, and using an eight bit pattern such as 00010000 or any variation thereof with, e.g., seven zeros and one bit. The timing diagram for the single shift register 50 is shown in FIG. 2B, particularly showing the output of a plurality of clock signals OUT1 . . . OUTN from respective output taps. (The shift register would of course allow the output of as many clock signals as there are output taps, were that to be necessary.)

Figure 3:
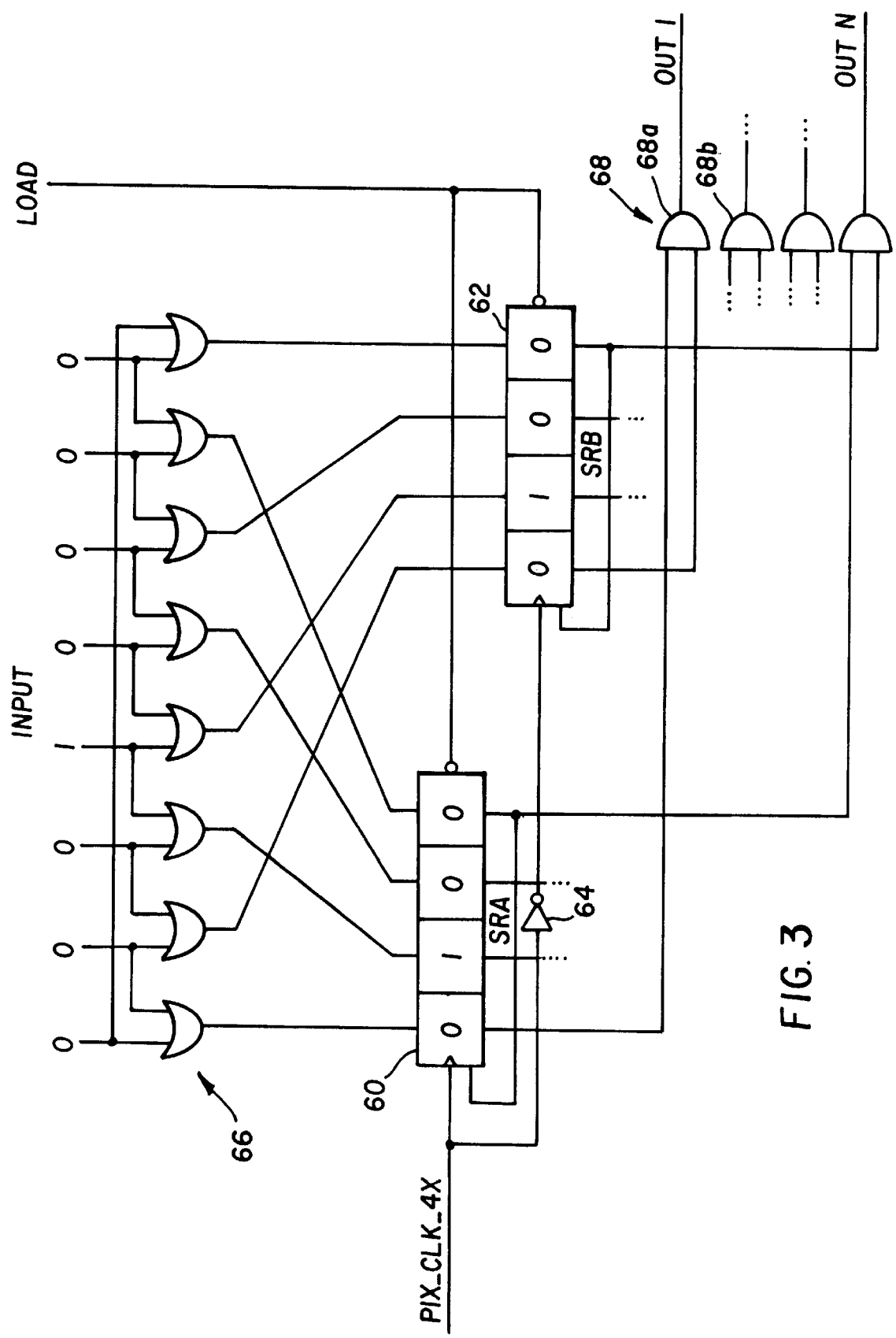
FIG. 3 is a diagram of a third implementation of a programmable clock generator according to the invention.

FIG. 3 shows a third embodiment of the clock generator 12, which is basically a variation of the circuit shown in FIG. 1A. Two four bit shift registers 60 and 62 are clocked out of phase by the clock signal PIX_CLK_4X, which is four times the PIXEL_CLK signal shown in FIG. 1B. The first shift register 60 is directly clocked by the PIX_CLK_4X signal, and the second shift register 62 by the same signal after being inverted in an inverter 64. The same pattern signal is input to both registers 60 and 62 through a set 66 of OR gates. This OR configuration allows the programmer to enter the desired final pattern (e.g., 10000000, corresponding to the duty cycle of the A signal in FIG. 1B), rather than entering a pre-encoded pattern (e.g., the 10001000 pattern entered in FIG. 1B), making it easier and more intuitive to program. The outputs OUT1 . . . OUTN are taken through a set 68 of AND gates connected to corresponding sections of each shift registers, i.e., AND gate 68a is connected to the first sections of shift registers 60 and 62, gate 68b to the second sections, and so on. This diagram thus provides four clock signal outputs according to the timing relationship shown in FIG. 1B.

Figure 4:
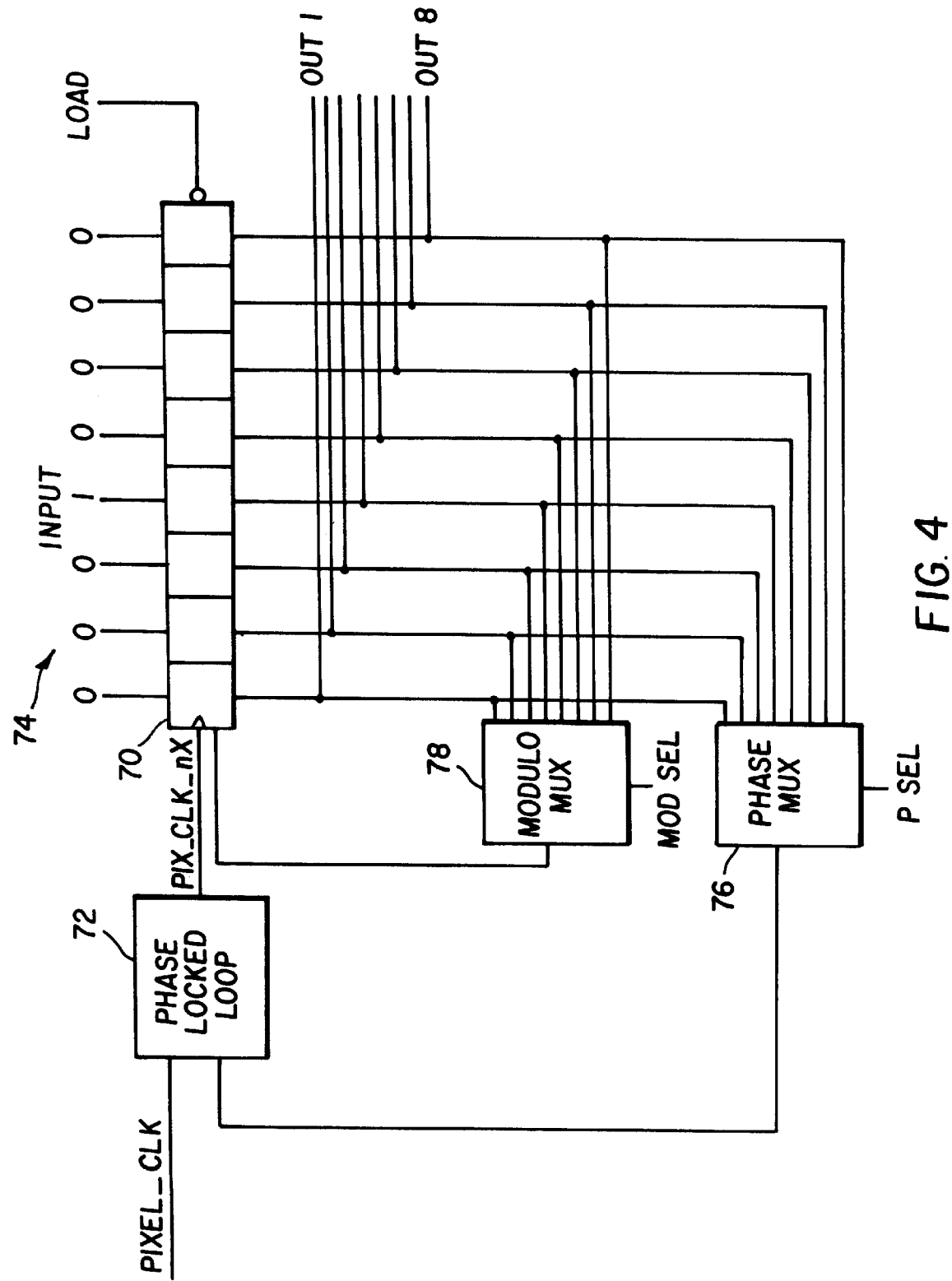
FIG. 4 is a diagram of a fourth implementation of a programmable clock generator according to the invention.

FIG. 4 shows a fourth embodiment of the clock generator 12, which has the advantage of a lower input clock frequency, more accurate edge positioning, and output pulse widths and pulse positionings that are other than powers of two (i.e., ⅓, ⅕, ⅙, ⅐) of the input pixel clock. A shift register 70 is clocked by the output of a phase locked loop 72, which receives the PIXEL_CLK signal and outputs a multiple nX of the pixel clock (PIX_CLK_nX) to a clock input of the shift register 70. The tap corresponding to the rising edge (pulse) of an input pattern 74 is selected by a phase multiplexer 76 so that the output thereof can be frequency locked to the PIXEL_CLK signal input to the phase locked loop 72. This establishes a fixed offset between the rising edges of the input PIXEL_CLK signal and the input pattern 74. The modulus of the shift register 70 is determined by a modulo multiplexer 78, which responds to a MOD_SEL input and chooses a desired end tap of the shift register 70. Different end taps cause different lengths of the shift register 70 to be recirculated, thereby changing the repetition rate of the output pulses and therefore the pulse positioning. Therefore, a modulus can be chosen (e.g., tap 6) which generates an output pulse width (e.g., ⅙) that is not based on a power of two proportion of the PIXEL_CLK signal period. An output clock signal OUT1 . . . OUTN can be taken from any of the shift register taps, and the repetition rate of an edge at the chosen output tap will depend on the tap selected by the modulo multiplexer 78.

The invention provides a number of key advantages over the prior art, including:

1). The frequency of the clock PIX_CLK_4X that is required to produce pulse widths and pulse positioning of (⅛) $T_{PIXEL\_CLK}$ can be reduced from $2T_{PIX\_CLK4X}$ to $T_{PIX\_CLK4X}$, where $T_{PIX\_CLK4X}=1/f_{PIX\_CLK4X}$. Reducing clock frequency results in several advantages, such as reducing electromagnetic interference and potentially allowing the use of Field Programmable Gate Array technology to quickly prototype the hardware system;

2). The pulse widths and positioning of pulses are programmable, thus obviating the need to physically change hardware if empirical techniques are required to determine proper pulse timing within an actual electronic system;

3). Pulse width and positioning are as accurate and precise as the quartz crystal oscillator required to produce the digital system clocks. This may provide an advantage over many analog delay techniques, which are subject to the wider tolerances of discrete passive components; and 4). Most digital systems today relay on ASIC technology to reduce system cost and increase performance. ASIC size can vary from 10,000 gates to as many as 500,000 gates, with the majority of designs falling into the 30,000 to 100,000 gate range. Depending on the requirements of the system, the invention can be implemented as part of an ASIC for as little as 200 to 300 gates per output signal, thus adding little, if any, cost to the overall system. Compare this to the cost of "delay lines", which can range from approximately $0.50 to several dollars, depending on accuracy, quantity, etc. In high volume products, the cost savings realized by the invention are substantial.

The invention has been described with reference to a preferred embodiment. However, it will be appreciated that variations and modifications can be effected by a person of ordinary skill in the art without departing from the scope of the invention.

Parts List
10 imaging device
12 clock generator
14 image sensor
16 object
18 optical section
20 input clock signals
22 analog signal processing section
24 a/d converter
26 digital signal processing section
28 microprocessor
40 first serial shift register
42 second serial shift register
44 logic section
46 and gate
48 inverter
50 light bit shift register
60 first four bit shift register
62 second four bit shift register
64 inverter
66 set of or gates
68 set of and gates
70 shift register
72 phase locked loop
74 input pattern
76 phase multiplexer
78 modulo multiplexer

We claim:

1. For use with an imaging device including a clock generator for producing an output clock signal, the clock generator comprising:

(a) means for producing first and second input pixel clock signals which are out of phase with each other;

(b) first and second recirculating shift registers which, in response to the first and second input pixel clock signals, respectively, recirculate their outputs back to their inputs;

(c) programmable means for providing first and second programmable input signals into the first and second shift registers, respectively, so that in response to the first and second input pixel clock signals, each of the first and second programmable input signals is recirculated from its respective input to produce first and second output shift register signals, the first and second programmable input signals causing the duty cycle of at least one of the first and second output shift register signals to be adjusted; and (d) summing means for summing the first and second output shift register signals to produce the output clock signal.

2. The clock generator according to claim 1 wherein the summing means is an AND gate.

3. The clock generator according to claim 1 wherein the programmable means further includes means for parallel-loading the first and second programmable input signals into the first and second shift registers, respectively.

* * * * *